Patented Mar. 28, 1944

2,345,533

UNITED STATES PATENT OFFICE 2,345,533

PROCESS FOR INCORPORATING FINELY DIVIDED MATERIALS IN MOLTEN COMPOSITIONS

George De Witt Graves, Wilmington, Del., assignor to E. I. du Pont de Nemours & Company, Wilmington, Del., a corporation of Delaware No Drawing. Application January 11, 1941, Serial No. 374,082

7 Claims. (Cl. 18—55)

The present invention relates to an improved process for incorporating a finely divided solid, such as a pigment, in a molten organic film- or filament-forming composition. The invention is particularly applicable to the incorporation of pigments in compositions such as disclosed in Carothers U. S. Patents Nos. 2,071,250, 2,130,523, and 2,130,948, which compositions will hereinafter be specifically referred to as "synthetic linear superpolymers."

It is frequently desired to prepare colored synthetic linear superpolymers for use in the production of colored wire coatings or other colored coatings or articles. When small quantities of the superpolymer are to be colored, it is disadvantageous to incorporate the pigment prior to polymerization of the superpolymers in accordance with U. S. Patent No. 2,205,722 since the production of superpolymers commercially is carried out in large autoclave batches and the introduction of colored pigments into the autoclave would require frequent cleanings, with small production and danger of contamination.

It is, therefore, an object of the present invention to provide an improved method of incorporating a finely divided solid in a molten organic film- or filament-forming composition for the production of more uniformly pigmented products.

It is another object of this invention to provide an improved process for the production of uniformly pigmented products comprising synthetic linear superpolymers.

It is another object of this invention to provide a process whereby a finely divided solid may be economically incorporated in small quantitities of molten synthetic linear superpolymers.

Other objects of the invention will appear hereinafter.

The objects of the invention may be accomplished by coating solid particles of an organic film- or filament-forming composition which is capable of being extruded or coated from a melt with a finely divided solid, either in the finely divided, dry form or in the form of a liquid dispersion, then melting and extruding or coating the molten composition with the solid distributed in it. The copending application of George D. Graves, Serial No. 282,266 now Patent No. 2,289,774, discloses in detail a particular type of particle, namely, flake or chip, which is especially adaptable for use in accordance with the present invention. However, it is to be understood that the invention is not limited to the flakes or chips of that application.

Preferably, the objects of the invention are accomplished by coating particles of an organic film- or filament-forming composition, which is capable of being extruded or coated from a melt, with a dispersion comprising a hydrophilic pigment, a film-forming agent, and a vehicle (either a solvent or a non-solvent for the film-forming agent) therefor and drying the coated polymer particles. The particles may then be melted and the molten mass extruded or coated to form pigmented structures.

For the purposes of this specification and the claims, a dispersion is a system of two phases, namely, the dispersoid phase and the dispersion medium. The dispersoid phase consists of discrete particles which are suspended in the dispersion medium and which respond independently of each other to Brownian movements, settling forces, stirring, etc. In other words, the dispersoid particles are not flocculated or agglomerated. The dispersion referred to above comprises a dispersion medium, which, in turn, comprises a vehicle and a film-forming agent, and a dispersoid phase, which comprises discrete particles of a pigment.

By the term "finely divided" as applied to pigments is meant the customary degree of sub-division which is generally of the order of 5 microns or less.

The following examples are illustrative of specific methods of pigmenting superpolymers in accordance with this invention. The invention is, of course, not to be limited by the specific details of these examples.

Example I

Seven grams of a film-forming agent consisting of an interpolymer, prepared by interpolymerizing 60 parts of hexamethylene diammonium adipate and 40 parts of caprolactam, are dissolved in a vehicle consisting of 93 grams of a methanol-water mixture (80% methanol and 20% water by weight). One gram of titanium dioxide is thoroughly dispersed in this solution of interpolymer. Flakes of bright polyhexamethylene adipamide are mixed with enough of the titanium dioxide dispersion to give 0.3% $TiO_2$ (based on the weight of the flakes) on the final flakes. The coated flakes are then spread out in an aluminum tray and stirred while the solvent evaporates therefrom. They are then dried for one hour in an air oven at 95°–100° C. The coated and dried flakes when melt spun into 30-denier, 15-filament yarn will have the $TiO_2$ well distributed and dispersed throughout the yarn. After being drawn approximately 400% (ratio of drawn to undrawn yarn, 4:1), the yarn has a tenacity of 4.5 grams per denier at 13.1% elongation.

*Example II*

One hundred grams of a 7% (by weight) solution of the interpolymer in methanol-water mixture, such as is described in Example I, are used as a film-forming agent and vehicle in which to disperse 7 grams of Cadmium Yellow No. 1 (Rowe Color Index No. 1272). Flakes of bright polyhexamethylene adipamide are coated with a sufficient quantity of this dispersion to contain thereon a deposit of 1% (by weight of the flakes) of the Cadmium Yellow. The coated flakes are dried as in Example I and melted in an atmosphere substantially free of oxygen. The molten composition is cooled to room temperature (approximately 70° F.), and cut into flakes for subsequent use in melt extrusion of wire coatings, filaments, films, sheets, rods, tubes, in injection molding of various articles, or for other uses. The pigment is well distributed throughout the flakes producing a uniformly colored product. Yarn spun from this superpolymer has good tenacity and other physical properties. Wire coatings produced from the polymer have good electrical insulating properties.

*Example III*

Ten grams of a film-forming agent, consisting of a non-heat hardening para-hydroxydiphenyl-formaldehyde resin known as BR-254 (obtainable from the Bakelite Corporation) are dissolved in 300 grams of toluene as a vehicle. 1.5 grams of soya lecithin are added to serve as a dispersing agent. Ten grams of finely divided carbon black pigment are added and the mixture is ground for 64 hours in a ball mill to obtain good dispersion of the carbon black in the film-forming agent and vehicle. Bright polyhexamethylene adipamide flakes are coated with a sufficient quantity of this dispersion to deposit thereon approximately 1% (by weight of the flakes) of carbon black upon evaporation of the toluene. The flakes are then dried. The coated and dried flakes are melt spun into monofils which are useful as bristles for paint brushes, etc. The carbon black pigment is well distributed in the polymer.

*Example IV*

Ninety-eight parts by weight of bright polyhexamethylene sebacamide flakes of the size described in the copending application of George D. Graves, Serial No. 282,266, filed June 30, 1939, now Patent No. 2,289,774, are coated with 2 parts by weight of a finely divided carbon black by thorough mixing in a tumbling barrel in the absence of any vehicle or film-forming agent. The coated flakes are then melted and extruded by means of gear pumps such as are described in the copending application of George D. Graves, Serial No. 232,314, filed September 29, 1938, now Patent No. 2,278,875, to produce a black sheet. This sheet may be oriented by cold-rolling or otherwise or may be used without orientation as a substitute for shoe sole leather or for other useful purposes.

As film-forming agents to be used for coating particles of organic film-forming compositions with pigments, numerous different materials may be used. As the preferred film-forming agent the synthetic linear interpolymer prepared by interpolymerizing 60 parts of hexamethylene diammonium adipate and 40 parts of caprolactam has been found to be most suitable. Preferably the above said interpolymer is dissolved in an 80% methanol and 20% water mixture. The interpolymer is soluble in the methanol-water mixture, and the pigment or delusterant can be dispersed therein.

It is to be understood that the film-forming agent is only film-forming in the sense that it causes the dispersed pigment to adhere to the particles of polymer. Thus a liquid film, such as diphenyloloctadecane, functions quite well.

As examples of other film-forming agents suitable for use in coating superpolyamide particles with a pigment the following may be mentioned. The interpolymer comprising 45% polyhexamethylene adipamide, 25% caprolactam polymer, and 30% 12-aminostearic acid polymer; the interpolymer comprising 15% polyhexamethylene adipamide, 40% polyhexamethylene sebacamide, and 45% caprolactam polymer; the interpolymer comprising 45% polyhexamethylene adipamide, 15% polyhexamethylene sebacamide, 25% caprolactam polymer, and 15% 12-aminostearic acid polymer; the interpolymer comprising 50% polyhexamethylene adipamide and 50% 12-aminostearic acid polymer; other interpolymers comprising other proportions of polyhexamethylene adipamide and 12-aminostearic acid polymer may also be used; 12-aminostearic acid polymer; dicresylcarbitol; hexamethylene bis-salicylamide; polyethylene oxide having a molecular weight of about 1500; octyl phenol; hydroxydiphenyl; N-ethyl toluene sulfonamide; diphenylol propane and its formaldehyde resins; tricresyl phosphate; tertiarybutyl phenolformaldehyde resins; and many other like materials. It is preferable that the film-forming agent to be used in effecting adherence of the pigment to the surface of the particles of organic film- or filament-forming composition be miscible with the molten organic film- or filament-forming composition, and it is necessary that the said film-forming agent be capable of withstanding temperatures at which the organic film- or filament-forming composition is melted. Naturally, the film-forming agent together with the vehicle used in attenuating the same must be capable of dispersing the pigment; and the film-forming agent, as well as the vehicle, should not deleteriously affect the physical characteristics of the structure ultimately to be formed from the organic film- or filament-forming composition.

As the vehicle, many solvents and solvent mixtures may be used. For example, mixtures of methanol and water, and toluene as disclosed in the examples are very suitable for this purpose. Other solvents such as other alcohol and alcohol-water mixtures may also be used. Chloroform and methanol mixtures as well as alcohol-chlorinated hydrocarbon mixtures, formic acid, etc., will be suitable for use in this capacity. It is, of course, preferable that the vehicles used be relatively good solvents for the film-forming agents, and that they be sufficiently volatile to be readily removed from the coated particles.

When the film-forming agent is a liquid, it is possible to dispense with the vehicle. For example, 25 parts of Cadmium Yellow pigment may be ground with 75 parts of 1-12 diphenylol octadecane in a three-roll mill of the type used in making printing inks. After the pigment is thoroughly dispersed in the diphenylol octadecane, 4 parts of the paste are added to 100 parts of flake polymer and the mixture rotated in a closed drum until the polymer flakes are uniformly coated with the pigment paste. The pigment coated flakes are then used for the melt extrusion of coated wire. The pigment is found to be uniformly dispersed in the wire coating. As examples of other liquid agents which may be used in this manner may be mentioned diamyl phenol, mixtures of ortho- and para-N-ethyl toluene sulfonamide, and liquid resins derived from formaldehyde and diphenylol octadecane or tertiary butyl phenol (of which the non-heat hardening type of resin is preferred).

It is within the scope of the present invention to use pigments, both organic and inorganic, other than those disclosed above as coloring agents if they will withstand the temperatures attained in melt extrusion of the polymer. For example, Cadmium Red No. 1124 (Rowe Color Index No. 1272), Cadmium Yellow No. 4 (Rowe Color Index No. 1272), "Celanthrene" Red Y (see page 336 of the 1939 Year Book of the American Association of Textile Chemists and Colorists), "Monastral" Fast Blue B Soluble (see page 393 of the Year Book above referred to), "Monastral" Fast Blue BSN (see page 393 of the Year Book above referred to), "Monastral" Fast Green GS (see page 393 of the Year Book above referred to), Violet No. 1 (Rowe Color Index No. 1290), Permanent Blue (Robinson Wagner Co., Inc., New York city), Ultramarine No. 511 (Rowe Color Index No. 1290), Cobalt Blue PFL (Rowe Color Index No. 1287), Pure Light Red Oxide R-2199 (Rowe Color Index No. 1276), Venetian Red 88L (Rowe Color Index No. 1276), a 40% Ramapo Blue 60% $TiO_2$ mixture, pearl essence, and other pigments or mixtures of them may be used for coloring polymers in accordance with this invention. Many cadmium pigments and copper phthalocyanines are useful in accordance with this invention. Hydrophilic types of pigments dispersed in a film-forming agent of the type compatible (or miscible) with the superpolymer comprise the preferred coating composition since, when such a combination is used, the pigment particles in the final superpolymer article are found to be exceptionally well dispersed (not flocculated), each particle being separated from its neighbors by superpolymer.

In using some of these pigments, it is possible in certain cases and for certain uses to dispense with the film-forming agent or both the film-forming agent and the vehicle. For example, it is possible to coat the polymer particles with a dispersion of the pigment in water, dry the coated particles and melt extrude commercially acceptable pigmented products. It is possible in some cases to dispense with the dispersion and to coat the superpolymer particles with a dry finely divided pigment, or other solid, by tumbling the two together, then melt extruding the pigmented polymer. This method is particularly applicable when the powdered solid is attracted to the polymer particles by electrostatic or other forces. Naturally, in the latter cases, the product will be more uniformly pigmented if there is active stirring and mixing by the extrusion pumps or other devices.

It is also within the scope of the present invention to modify synthetic linear superpolymers by dispersing other materials in the superpolymers; for example, anti-oxidants, anti-embrittlement agents (such as phenothiazine), fillers, plasticizers, resins, stabilizers, etc. For example, particles of synthetic linear superpolymers may be coated with resins, such as phenol-formaldehyde type resins, then melted and extruded to obtain products having the resins well distributed in the superpolymers.

The particles of superpolymers to which the invention is applicable preferably are flakes or chips having an average width and length of approximately ¼ inch and an average thickness of approximately ⅛ inch. For best results, the particles should have a surface area within the range of 0.02 square inch to 1.00 square inch and a thickness within the range from 0.05 to 0.20 inch. However, good results may be obtained with even larger particles.

This invention is useful in the production of filaments, yarns, monofils, films, sheets, wire coatings, fabric coatings, other coatings, injection molded articles, and other articles having finely divided solids distributed in synthetic linear superpolymers.

In accordance with the present invention, it is possible to economically pigment small quantities of organic film- or filament-forming compositions, for example, synthetic linear superpolymers. A great variety in shades of polymers can be made without requiring the use of an autoclave for incorporating the pigment in the polymer. By the process of the present invention, pigments may be very uniformly distributed and dispersed in molten organic film- or filament-forming compositions, and satisfactory results are obtained with a minimum amount of pigment with the maximum effect. The process of the present invention furthermore provides a process whereby pigments may be incorporated in the ultimate products from the film- or filament-forming compositions, which products will have very desirable physical characteristics.

Since it is evident that many changes and modifications can be made in the above-described details without departing from the nature and spirit of the invention, it is to be understood that the invention is not to be limited to the details set forth except as set forth in the appended claims.

I claim:

1. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a finely divided solid pigment that is insoluble in and incompatible with said polyamide, said particles having a surface area between 0.02 sq. in. and 1.00 sq. in. and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

2. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a liquid dispersion of a finely divided solid pigment that is insoluble in and incompatible with said polyamide, said particles having a surface area between 0.02 sq. in. and 1.00 sq. in and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

3. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a liquid dispersion comprising a finely divided solid pigment that is insoluble in and incompatible with said polyamide and a film-forming agent capable of adhering the finely divided pigment of said particles of polyamide, said particles having a surface area between 0.02 sq. in. and 100 sq. in. and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

4. The process of incorporating a finely divided solid pigment in a molten synthetic linear polyamide comprising the reaction product of a linear poly-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a liquid dispersion comprising a finely divided solid pigment that is insoluble in and incompatible with said polyamide, a film-forming agent capable of adhering the finely divided pigment to said particles of polyamide, and a volatile vehicle for said solid and agent, said particles having a surface area between 0.02 sq. in. and 1.00 sq. in. and a thickness of between 0.05 and 0.20 in., completely melting said coated particles into the form of a molten body of liquid, and moving said body of liquid through a structure forming device whereby said finely divided solid pigment will be uniformly and homogeneously incorporated throughout said polyamide.

5. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a liquid dispersion comprising a finely divided solid pigment that is insoluble in and incompatible with said polyamide and a synthetic linear polyamide prepared by interpolymerizing 60 parts of hexamethylene diammonium adipate and 40 parts of caprolactam, said particles having a surface area between 0.02 sq. in. and 1.00 sq. in. and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

6. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acid, which comprises, coating solid particles of said polyamide with a liquid dispersion comprising a finely divided solid pigment that is insoluble in and incompatible with said polyamide, an 80% methanol-20% water mixture, and a synthetic linear polyamide prepared by interpolymerizing 60 parts hexamethylene diammonium adipate and 40 parts of caprolactam, said particles having a surface area between 0.02 sq. in. and 1.00 sq. in. and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

7. The process of incorporating a finely divided solid pigment in a molten synthetic linear polyamide comprising the reaction product of a linear polymer-forming composition which contains in substantial amount reacting material selected from at least one of the groups consisting of (a) monoaminomonocarboxylic acids, and (b) mixtures of diamine with dibasic carboxylic acids, which comprises, coating solid particles of said polyamide with a finely divided solid pigment in the dry state, said particles having a surface area between 0.02 sq. in. and 1.00 sq. in. and a thickness of between 0.05 in. and 0.20 in., completely melting said coated particles into the form of a molten body of liquid, and moving said body of liquid through a structure forming device whereby said finely divided solid pigment will be uniformly and homogeneously incorporated throughout said polyamide.

GEORGE DE WITT GRAVES.

CERTIFICATE OF CORRECTION.

Patent No. 2,345,533.  March 28, 1944.

GEORGE DE WITT GRAVES.

It is hereby certified that error appears in the printed specification of the above numbered patent requiring correction as follows: Page 4, first column, line 29, claim 3, for "100 sq. in." read --1.00 sq. in.--; line 40, claim 4, for "poly-forming" read --polymer-forming--; and that the said Letters Patent should be read with this correction therein that the same may conform to the record of the case in the Patent Office.

Signed and sealed this 23rd day of May, A. D. 1944.

Leslie Frazer

(Seal)  Acting Commissioner of Patents.